United States Patent
Rossi

(10) Patent No.: US 6,443,053 B1
(45) Date of Patent: Sep. 3, 2002

(54) COOKING VESSEL FOR STEAMER

(75) Inventor: Fabrice Rossi, Fontaine (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/856,122

(22) PCT Filed: Nov. 19, 1999

(86) PCT No.: PCT/FR99/02840

§ 371 (c)(1), (2), (4) Date: Aug. 21, 2001

(87) PCT Pub. No.: WO00/30511

PCT Pub. Date: Jun. 2, 2000

(30) Foreign Application Priority Data

Nov. 19, 1998 (FR) .............................................. 98 14736

(51) Int. Cl.[7] ........................... A47J 27/04; A47J 27/05; A47J 27/12; A47J 43/24; F24D 1/00

(52) U.S. Cl. ............................. 99/340; 99/413; 99/417; 99/448; 99/450; 126/20; 126/369

(58) Field of Search .......................... 99/339, 340, 341, 99/400, 401, 403, 410–418, 444–450, 483, 473, 476; 126/20, 369, 369.1, 369.2, 373.1, 377.1; 219/401; 220/912, 428, 408, 409; 426/418, 509–511, 523

(56) References Cited

U.S. PATENT DOCUMENTS

| | | | | |
|---|---|---|---|---|
| 1,750,596 A | * | 3/1930 | Hois ........................... | 126/369 |
| 2,040,004 A | * | 5/1936 | Kelsay ........................ | 126/369 |
| 2,393,420 A | | 1/1946 | Scheuplein | |
| 3,641,926 A | * | 2/1972 | Williams et al. .............. | 99/448 |
| 3,709,544 A | | 1/1973 | Oltmanns | |
| 4,106,486 A | * | 8/1978 | Lee ........................... | 99/450 X |
| 4,138,939 A | | 2/1979 | Feld | |
| 4,649,811 A | * | 3/1987 | Manganese ................ | 99/340 X |
| 4,702,160 A | * | 10/1987 | Manganese ............. | 126/369 X |
| 5,189,947 A | * | 3/1993 | Yim ........................ | 219/401 X |
| 5,199,347 A | * | 4/1993 | Chen ........................ | 99/418 X |
| 5,235,904 A | * | 8/1993 | Ludena ..................... | 99/340 X |
| 5,275,094 A | * | 1/1994 | Naft .......................... | 99/448 X |
| 5,287,798 A | * | 2/1994 | Takeda ..................... | 99/417 X |
| 5,349,898 A | * | 9/1994 | Cheung .................. | 126/369 X |
| 5,756,968 A | | 5/1998 | Chung | |
| 5,794,525 A | * | 8/1998 | Fan ........................ | 99/448 X |

FOREIGN PATENT DOCUMENTS

| | | |
|---|---|---|
| CH | 366137 | 1/1963 |
| EP | 0 142 491 | 5/1985 |
| EP | 0 788 754 | 8/1997 |
| FR | 2 730 917 | 8/1996 |
| WO | 98 29014 | 7/1998 |

* cited by examiner

Primary Examiner—Timothy F. Simone
(74) Attorney, Agent, or Firm—Browdy and Neimark

(57) ABSTRACT

A cooking element for a steamer, composed of: a tubular side wall; a removable perforated bottom, the tubular side wall having an interior surface provided with a shoulder on which the perforated bottom rests; a first element carried by the interior surface of the tubular side wall; and a second element carried by, and located beneath, the perforated bottom. The first element is located to block the second element when the perforated bottom rests on the shoulder, one of the elements is a tongue, and the other of the elements is an abutment. A cooking element for a steamer, composed of a tubular side wall, a removable perforated bottom and a removable handle, wherein the perforated bottom has orifices adapted for rapid connection of the removable handle.

23 Claims, 5 Drawing Sheets

COOKING VESSEL FOR STEAMER

The present application is the national stage under 35 U.S.C. §371 of international application PCT/ER99/02840, filed Nov. 19, 1999 which designated the United States, and which application was not published in the English language.

The present invention relates to the production of a cooking vessel for a steamer, the latter comprising a heating part for producing vapor and a cooking vessel composed of one or several elements disposed on one another vertically on said heating part.

A steamer according to the prior art generally comprises two main parts, which are the heating part and the vessel part that will receive food products that it is desired to cook.

The heating part comprises, interalia, a water vessel and a heating body immersed in this water for the production of steam. This latter rises to reach the cooking vessel. Preferably, a vessel for recovering juices is placed between the heating part and the cooking vessel.

The cooking vessel comprises at least one cooking element composed of a tubular side wall provided with grasping means, for example in the form of handles, and of a bottom that is perforated in order to allow passage of steam over the food products disposed on this bottom. The steam thus traverses the different cooking elements in order to escape through a lid provided with orifices.

It is desirable that the height of the cooking element be adapted to that of the food products to be cooked depending on whether one is considering, for example, cooking fish or a chicken. It is equally desirable that the orifices in the bottoms of these elements have different geometries as a function of the type of food product to be cooked. However, as well as for economic reasons as for reasons of the space available to users, a compromise must be made in the proposed cooking elements offered with the steamers presently sold.

The document WO 98/29014 describes a cooking vessel for a steamer, constituted by at least one cooking element composed of a tubular side-wall and a removable element having a perforated bottom. The cooking element is arranged to be assembled with at least one similar element. The removable element with a perforated bottom has a peripheral side wall that extends upwardly from the bottom. The side wall has at its upper end an outer rim provided to bear on an inner flange provided in the lower part of the bottom of the tubular side wall. Two handles are mounted to be movable in rotation in the side wall of the removable element. The handles can thus be folded back. The removable element can be placed in a serving dish.

This form of construction permits the users to be offered a large of variety of cooking elements having different interior volumes in which the removable element with a perforated bottom is adapted to the type of food product to be cooked. However, the extraction of the removable element with a perforated base is difficult. During cooking, the handles rest on the rim of the removable element. Condensation or cooking juices are capable of falling onto the handles. The handles can be hot and are difficult to reach by the user who must lift them in order to withdraw the removable element having a perforated bottom. In addition, after having withdrawn this element with a perforated bottom, the transfer of food products that require delicate handling after cooking, such as fish, is difficult because of the rim surrounding the perforated bottom. In addition, the removable element of the bottom is simply placed at the interior of the tubular side wall.

An object of the invention is to facilitate the handling of a cooking element for a steamer.

Another object of the invention is to facilitate the presentation of certain food products that require delicate handling after cooking, such as fish.

In other object of the invention is to facilitate extraction of the removable bottom.

These objects are achieved with a cooking element for a steamer composed of a tubular side wall and a removable perforated bottom, in which the perforated bottom has orifices adapted for rapid connection of a removable handle bottom.

Thus, the handle can be connected to the bottom after cooking of the food products, which protects the user from burns during withdrawal of the removable bottom. Gripping of the handle is facilitated.

According to one embodiment, the handle has two ends each having a pair of elastic claws with a beveled edge, the beveled edges being arranged to cooperate with the walls of the orifices during insertion of the claws into said orifices. Simple insertion of the claws into the orifices thus permits the handle to be secured with the perforated bottom.

According to one embodiment, the cooking element has an elongated form and the orifices are disposed in proximity to the periphery in the part of the perforated bottom having the smallest width.

According to one embodiment, tubular side wall has on its interior perimeter a shoulder on which the perforated bottom comes to bear. The shoulder can be annular or have breaks.

Advantageously then, at least one abutment, mounted at the inside of the tubular side wall, respectively mounted under the perforated bottom, is provided to block a tongue, mounted under the perforated bottom, respectively at the inside of the tubular side wall. This arrangement permits the bottom to be secured with the side walls, which facilitates handling of the cooking element.

Advantageously, the abutment or abutments, respectively the tongue or tongues, have an inclined face provided to push back the corresponding tongue, respectively the corresponding abutment, during insertion of the perforated bottom into the lateral side wall. These arrangements permit the bottom to be secured with the tubular side wall by simple insertion of the bottom, without requiring any particular maneuvering of the tongues. During use, the forces are principally directed toward the bottom; this is why the perforated bottom is introduced from the top and rests on the shoulder. Assembly of the cooking element is thus facilitated.

Advantageously then, the abutment provided to block one or several tongues arranged under the perforated bottom is formed by the shoulder having an inclined upper face provided to push back the outer rim of the tongues. The abutment or abutments can equally be disposed under the shoulder or under the perforated bottom.

Advantageously also, the perforated bottom has two orifices diametrically aligned with the two tongues, the tongues being disposed at the periphery of the orifices. This arrangement facilitates extraction of the bottom by simple pulling on the handle. The pulling on the handle provokes a flexing of the bottom which librates the tongues from the abutment.

These objects are equally achieved with a cooking element for a steamer composed of a tubular side wall and of a removable perforated bottom, the tubular side wall having on its interior perimeter a shoulder on which comes bear the perforated bottom, by the fact that at least one abutment, mounted at the inside of the tubular side wall, respectively mounted under the perforated bottom, is provided to block a tongue, mounted under the perforated bottom, respectively at the interior of the tubular side wall. This arrangement permits the bottom to be secured with the side walls, which facilitates handling of the cooking element.

Advantageously then the abutment provided to block one or several tongues provided under the perforated bottom is formed by the shoulder having an inclined upper face provided to push back the outer rim of the tongue or tongues. Such a configuration permitting the tubular side wall to be secured to the removable bottom is of a particularly economical construction.

Advantageously, the perforated bottom is arranged in a manner to be able to be disconnected from the tubular side wall by pulling on a handle mounted on the perforated bottom. The handle can be fixed or removable.

According to one embodiment, the perforated bottom has two points for connecting the handle diametrically aligned with the two tongues, the tongues being disposed at the periphery of the connection points of the handle. Such a configuration permits disconnection of the tubular side wall and the removable bottom in an easy manner, the pulling on the handle leading to a flexing of the bottom permitting the tongues to be freed from the abutments.

According to one embodiment, the perforated bottom has two orifices, provided for rapid attachment of a removable handle.

Advantageously, the perforated bottom has along at least one-tenth of it periphery a zone that is free of an upper side wall. This arrangement permits the transfer onto a dish of food products that are not easily handled after cooking, such as fish, while limiting the risks of breaking apart.

Also advantageously, the perforated bottom is formed by a grid not having an upper side wall is not present. One can then use a plurality of different removable grids that are not very cumbersome. With a set of grids adapted to different types of cooking, one can change the grid as a function of the cooking to be performed. This arrangement permits the production of a product that performs well without being cumbersome. Additional grids can be envisioned to cause to product to evolve. The replacement of grids by after sale services is facilitated. In addition such grids are flexible.

According to one embodiment, the perforated bottom and the tubular side wall are made of polycarbonate.

Advantageously, the perforated bottom has a plurality of orifices that are elliptical or round in form. This arrangement has allowed the creation of a grid called "turbo diffusion" having an increase of around 25% of the surface for passage of steam with respect to the surface of the bottom due the combination of orifices of elliptical and circular form. This arrangement permits the passage of steam and the flow of cooking juices to be facilitated, while retaining the food products. Preferably, at least 15% of the surface of the perforated bottom is formed by orifices for the passage of steam.

The invention will be better understood from the detailed description of the drawings, which are in no way limiting, in which.

Figure 1:
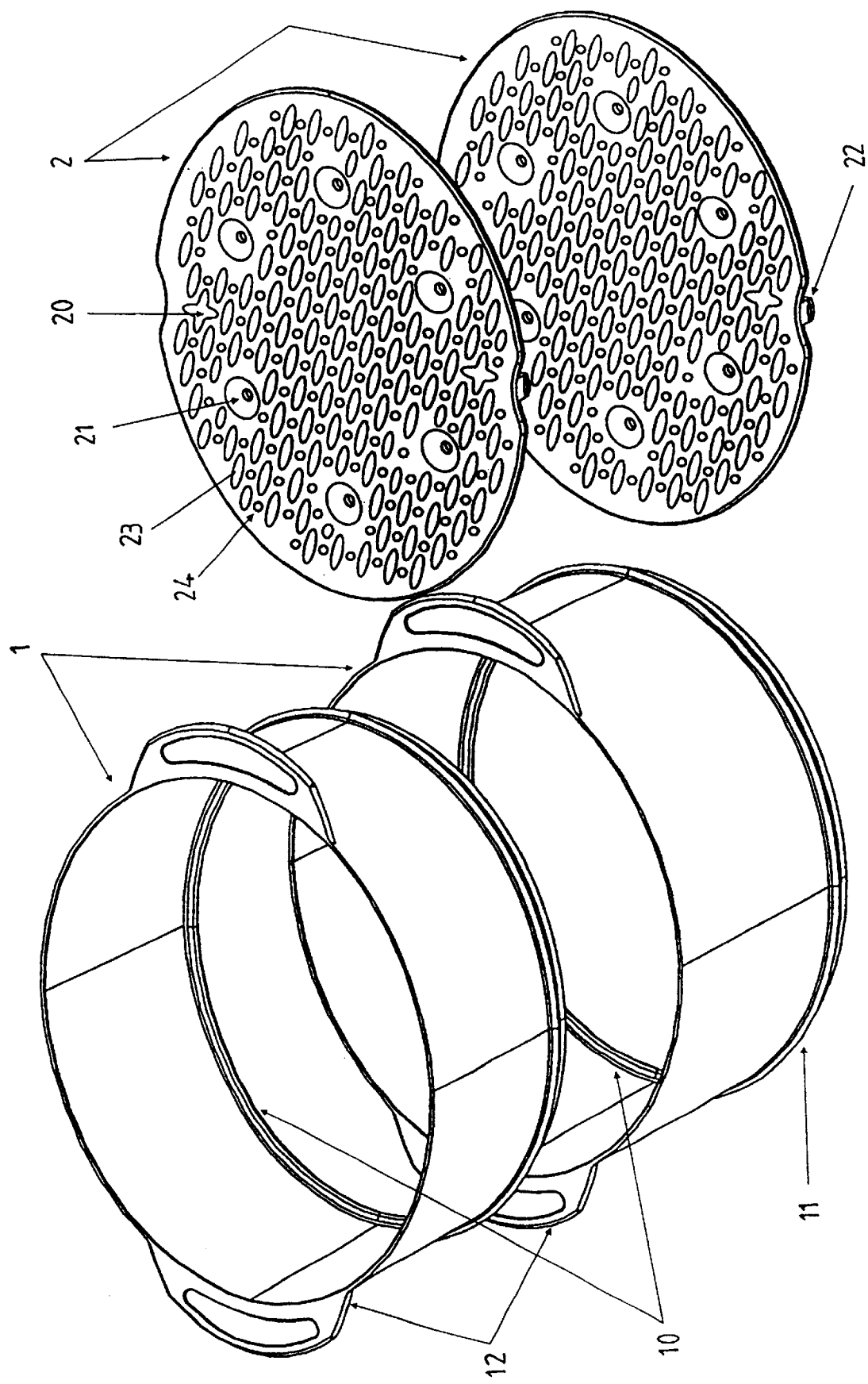
FIG. 1 is a view of two cooking elements with their grids.
Figure 4:
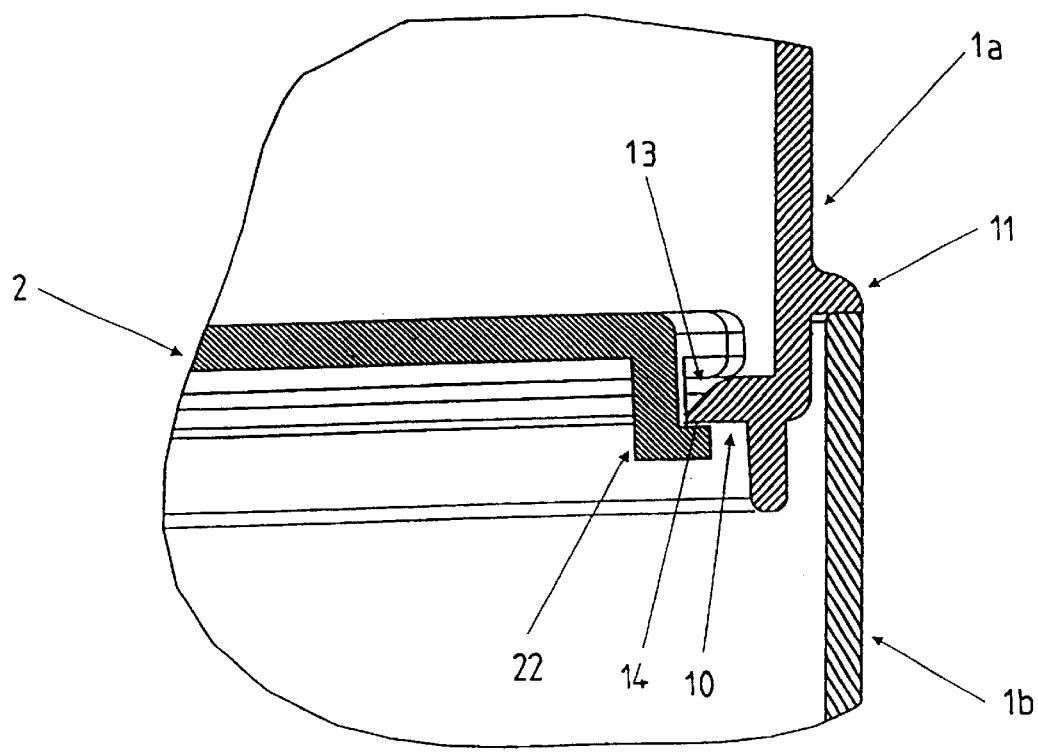
FIG. 4 illustrates in cross-section a form of construction of a snap-in attachment.

On FIG. 1 is shown in a schematic manner two cooking elements, usually called cooking bowls, composed of tubular side walls 1 and grids 2. One notes on the grid two orifices 20 having a form particularly adapted to the reception of the handle 3 shown in FIG. 2. Steam passes through the grid via orifices 21, 23 and 24 in order to reach the food products placed thereon. One notes on the grid 2 a holding tongue 22 which comes to cooperate with the inner shoulder 10 projecting from the interior of wall 1. By this fact, this shoulder serves on the one hand as a support surface around the entire circumference of the grid and on the other hand serves to retain this same grid by tongue 22 which comes by its L-shaped form to be placed under the shoulder (as illustrated in FIG. 4).

Wall 1 has an exterior shoulder 11 on its outer surface which serves as a stop during stacking of elements. The elements are of slightly conical form so that the lower outer diameter is slightly smaller then the upper interior diameter of the same element. By this fact, the elements nest in one another and the outer shoulder 11 of the upper element comes to rest on the upper edge of the lower element (shown in detail in FIG. 4).

It will thus be understood that one can utilize one, two, even three cooking elements superposed to form a cooking vessel with one, two, or three separated compartments. But above all, one can stack on a cooking element one or several side walls 1 to form a cooking vessel with a single chamber of large volume able to receive for example a chicken.

Two handles 12 are provided for handling an element.

Figure 2:
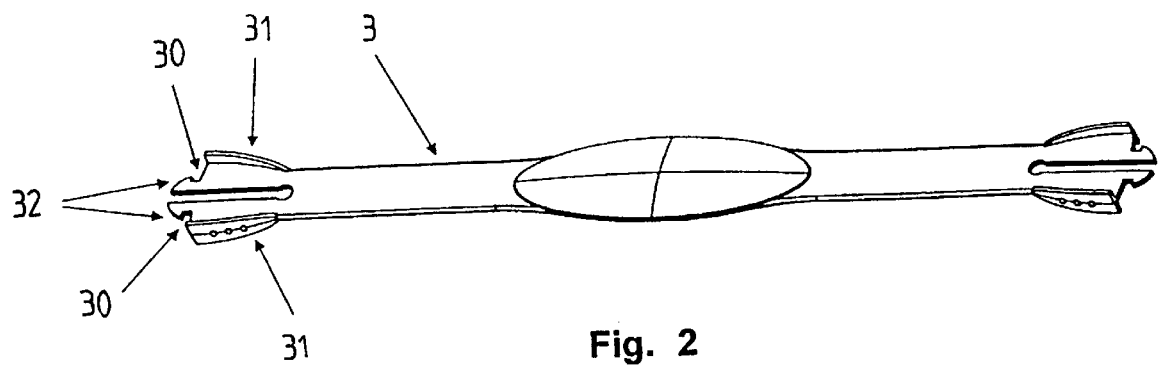
FIG. 2 illustrates, in its storage position, the handle for extracting the grid.

FIG. 2 shows a detailed view of removable handle 3. This is represented in its storage position since being made of a flexible material, it is then curved in order to be placed into the two orifices 20 of grid 2. During the introduction of one of the ends in grid 2, the two claws 32 come to bear on the lower face of grid 2 and thus prevent handle 3 from being withdrawn. This introduction is rendered possible by the elasticity of the two claws 32 being contracted on passage through grid 2. Handle 3 benefits from a good seating due to its two edges 30 which come to bear on grid 2. Withdrawal of handle 3 is effectuated by a pressure on the two cheeks 31, retracting the two claws 32 and permitting the end of handle 3 to pass through grid 3. The lid of the cooker (not shown) will advantageously have a form permitting it to serve as a support on which grid 2 can come to be placed. Handle 3 is then withdrawn in order to permit an adequate use, for example the serving of a fish disposed on grid 2 resting on said support.

Figure 3A:
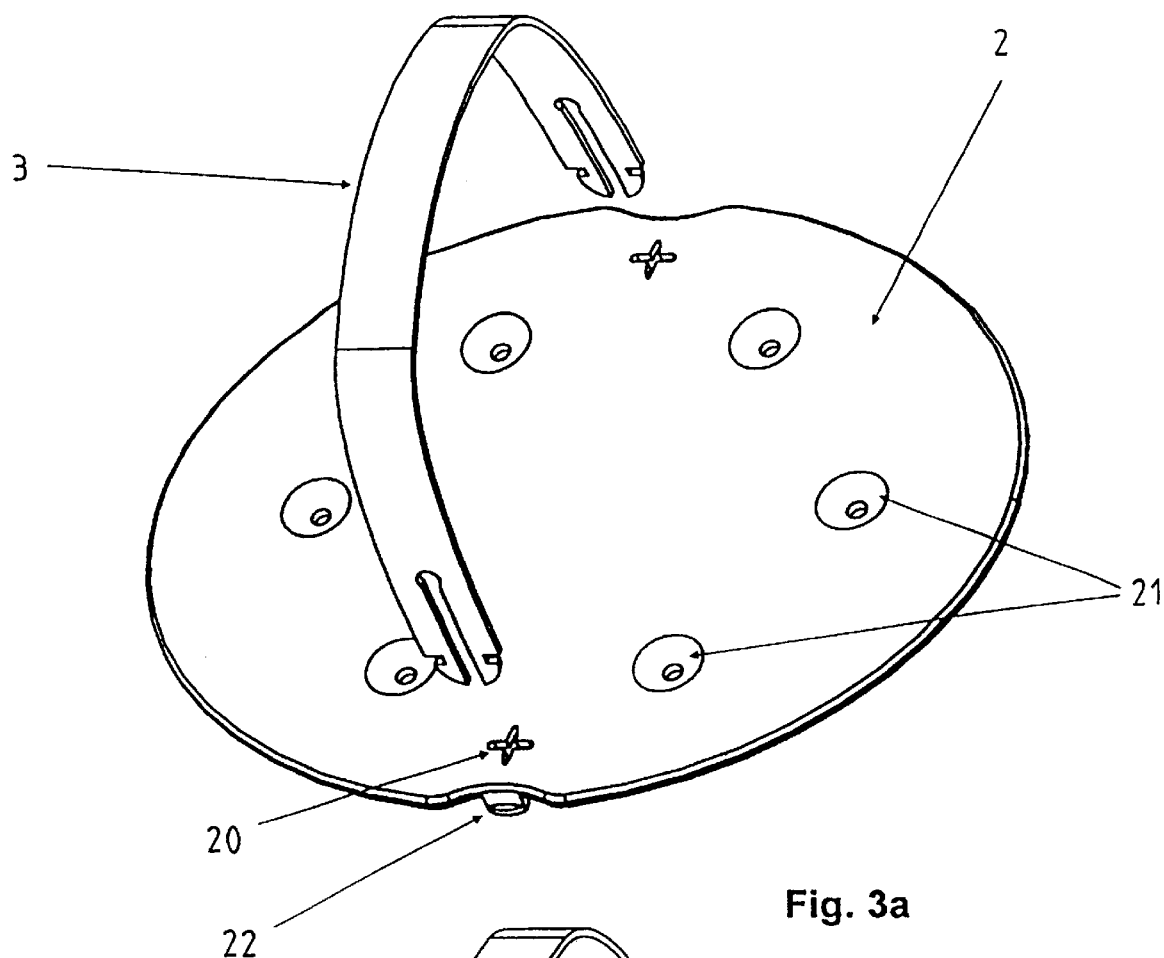
FIGS. 3a and 3b illustrate the installation of the handle.
Figure 3B:
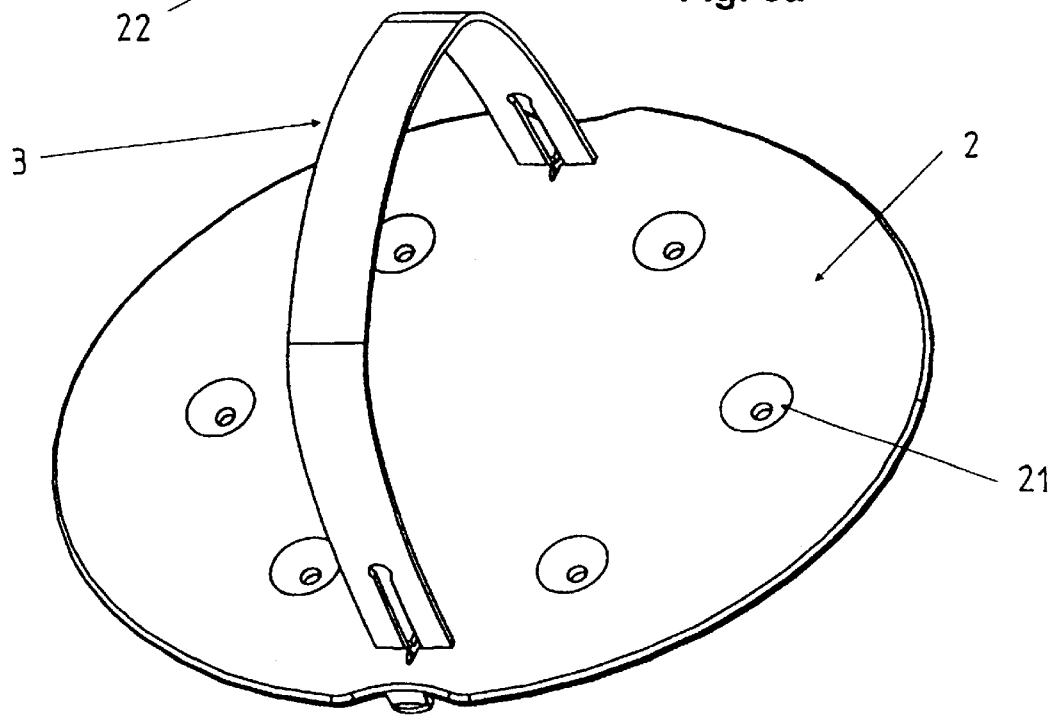

The two FIGS. 3a and 3b illustrate in a more precise manner the introduction of handle 3. On FIG. 3a, one notes the two orifices 20 especially reserved for the ends of handle 3, orifices in which the two claws 32 of handle 33 are going to be able to be inserted by elasticity. FIG. 3b shows handle 3 in the position secured to grid 2.

Moreover, orifices 21 of grid 2 illustrated in these figure correspond to the state of the art.

In another form of construction of the grid, the orifices disposed on the periphery thereof and intended for the passage of steam are of a form permitting introduction of the ends of the handle. Thus, the latter can be placed in any position depending on the availability allowed by the food products that are in place.

FIG. 4 shows in cross section the superposition of tubular wall 1a of an upper element and of tubular wall 1b of a lower element, as well as the snap fitting of grid 2 with upper tubular wall 1a. The superposition of the two walls is assured due, on the one hand, to the differences in diameter permitting a natural nesting, and, on the other hand, by the bearing on shoulder 11 of upper wall 1a. One notes a shoulder 10 on the inner face of wall 1a which serves to retain grid 2. The lower face of this shoulder forms an abutment 14 is utilized by a tongue 22, mounted under grid 2, to block the latter in its working position, such as is clearly visible in FIG. 4. This placing is possible by elastic deformation of tongue 22, an operation facilitated by the inclined form of the upper face 13 of shoulder 10 at this location. One can equally have a lower and half-inclined beginning for unsnapping.

By way of variation, abutment 14 and inclined face 13 can be arranged on a shoulder disposed under shoulder 10 provided to support grid 2. Equally by way of variation, this shoulder could be provided under grid 2, the elastic tongues 22 being extended from lateral wall 1, for example extended from the lower face of shoulder 10 and disposed substantially vertically. Abutment 14 and inclined face 13 can be annular, which is well adapted to round forms. One or several abutments with an inclined upper face can equally be provided in the case where the position of the tongue or tongues is defined, for example two abutments with one inclined upper face on the small diameter of an ellipse.

As shown in FIG. 1, two tongues 22 are disposed facing one another on the small diameter of grid 2. The two orifices 20 provided for the connection of handle 3 are disposed in alignment between the two tongues 22.

Figure 5:
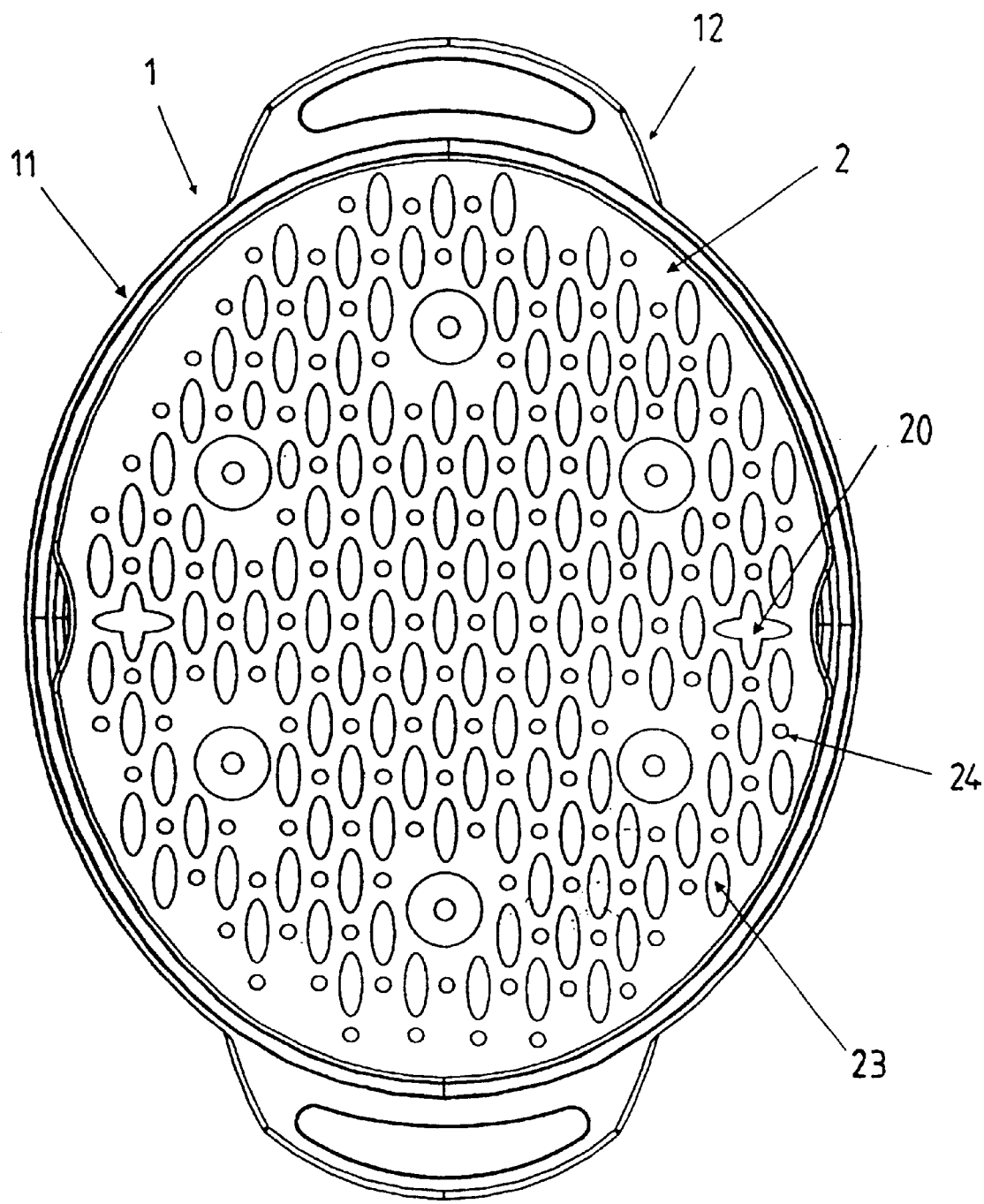
FIG. 5 illustrates the vessel with its "turbo diffusion" grid.

The bottom view of the complete element of FIG. 5 shows the grid 2 called of "turbo diffusion" with elliptical orifices 23 and circular orifices 24, offering a large surface area for passage of steam. One notes the two opening 20 reserved for the removable handle.

Grid 22 advantageously has from 2.5 to 25% of openings provided for the passage of steam, and preferably 15 to 25%. As illustrated in FIG. 5, grid 2 has 25% of openings.

Thus one can chose the type or types of grids adapted to each type of food product. Other distributions and geometries can be envisioned for orifices for the passage of steam.

In the preferred embodiment of the invention, the bottoms as well as the tubular side walls are made of polycarbonate. Other materials could be used such as for example stainless steel.

Figure 6:
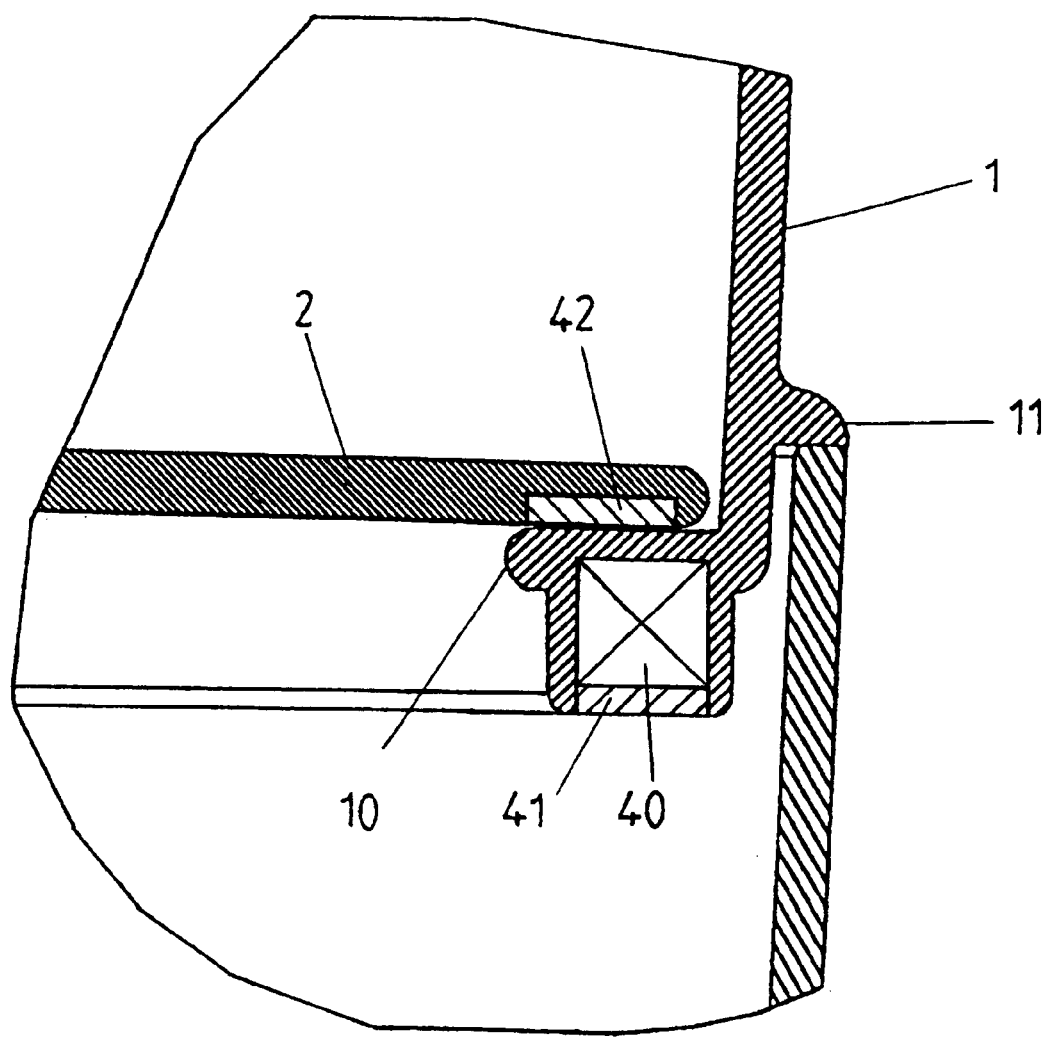
FIG. 6 illustrates in cross-section a form of construction of a magnetic assembly.

The form of construction shown in FIG. 6 differs from the form of construction shown in FIG. 4 in that grid 2 forming a perforated bottom and lateral wall 1 are connected together by magnetic means.

One notes housed at the interior of shoulder 10 a magnetized element 40. The magnetized element or magnet 40 has a permanent magnetization. Magnetized element 40 can be overmolded when tubular side wall 1 is produced from plastic material. Magnetized element 40 can equally be mounted in a housing of tubular side wall 1. One part 41 forms a hiding place which prevents magnetized element 40 from being placed in the free air or being able to come in contact with steam or food products. Magnetized element 40 can be annular, but for reasons of cost several distinct magnetized elements 40 can be distributed in shoulder 10. In the example of construction shown in FIG. 6, magnetized element 40 is a parallelepiped part. Shoulder 10 on which comes to bear the periphery of grid 2 is annular but can as an example of variation be constituted by distinct protuberances.

Correspondingly, grid 2 has a magnetic element 42. Magnetic element 42 does not have its own permanent magnetization. Magnetic 42 element can be annular. Such an arrangement is particularly suitable for round cooking elements in which the position of the bottom is not important. Magnetic element 42 can for example be overmolded in grid 2 when the grid is fabricated of plastic material. Grid 2 can equally be made of a magnetic material such as magnetic stainless steel. Grid 2 can equally have several magnetic elements 42 distributed on the periphery of the grid, this arrangement being particularly suitable for vessels having an elliptical geometry. In the example of construction shown in FIG. 6, magnetic element 42 is a thin plate.

A handle for rapid connection can be associated with a grid having magnetic means. Particularly in the example of construction shown in FIGS. 1, 2, 3a and 3b, the two tongues 22 of grid 2 can be replaced by two magnetic or magnetized elements, the lateral side wall being correspondingly modified.

By way of variations other arrangements can be envisioned. Particularly grid 2 can have one or several magnetized elements and wall 1 or several magnetic elements. It can equally be envisioned to replace the magnetic elements by magnetized elements. The magnetic or magnetized elements can be disposed in or against the portion of the lateral wall surmounting shoulder 10 as well as in or against an upper or lower peripheral rim of grid 2 forming the perforated bottom.

The invention is not limited to elements having an oval form as illustrated but can be applied to any other form, for example round.

By way of variation one can equally envision feet on the lower face of the grid, to facilitate placement of the grid, for example on a serving dish in order to serve a fish.

The present invention finds its application in steamers, in particular electric, having a base structure to produce steam, surmounted by a cooking vessel formed by one or several cooking elements having a removable base.

What is claimed is:

1. A cooking element for a steamer, said cooking element comprising:
   a tubular side wall;
   a removable perforated bottom, said tubular side wall having an interior surface provided with a shoulder on which said perforated bottom rests;
   a first element carried by said interior surface of said tubular side wall; and
   a second element carried by, and located beneath, said perforated bottom, wherein
      said first element is located to block said second element when said perforated bottom rests on said shoulder, one of said elements is a tongue, and the other of said elements is an abutment.

2. The cooking element of claim 1 wherein one of said first and second elements has an inclined face provided to push back the other of said first and second elements during introduction of said perforated bottom into said tubular side wall and positioning of said perforated bottom on said shoulder.

3. Cooking element according to claim 2, wherein said abutment is formed by a portion of said shoulder and has an inclined upper face provided to push back said tongue during placement of said perforated bottom onto said shoulder.

4. The cooking element according to claim 1 in combination with a handle connectable to said perforated bottom, wherein said perforated bottom is separable from said tubular side wall by pulling on said handle when said handle is connected to said perforated bottom.

5. The cooking element according to claim 4 wherein there are two said tongues, said perforated bottom has two connection points for connection of said handle, said connection points are diametrically aligned with said tongues, and said tongues are disposed peripherally at said connection points.

6. The cooking element according to claim 4 wherein said perforated bottom has two orifices provided for rapid connection of said handle.

7. A cooking element for a steamer, said element comprising a tubular side wall and a removable perforated bottom, in combination with a removable handle, wherein said perforated bottom has orifices adapted for rapid connection of said removable handle.

8. The cooking element according to claim 7, wherein said handle has two ends each carrying a pair of elastic claws with beveled edges, said beveled edges being arranged to cooperate with the walls of said orifices during insertion of the claws into said orifices.

9. The cooking element according to claim 7, wherein the cooking element has an elongated form and said orifices are disposed in proximity to the periphery in the part of the perforated bottom having the smallest width.

10. The cooking element according to claim 7, wherein said tubular side wall has a lower inner perimeter provided with a shoulder on which said perforated bottom comes to bear.

11. The cooking element according to claim 10, further comprising:
a first element carried by said interior surface of said tubular side wall; and
a second element carried by, and located beneath, said perforated bottom, wherein
said first element is located to block said second element when said perforated bottom rests on said shoulder, one of said elements is a tongue, and the other of said elements is an abutment, and
one of said first and second elements has an inclined face provided to push back the other of said first and second elements during introduction of said perforated bottom into said tubular side wall and positioning of said perforated bottom on said shoulder.

12. The cooking element according to claim 11, wherein said abutment is formed by a portion of said shoulder and has an inclined upper face provided to push back said tongue during placement of said perforated bottom onto said shoulder.

13. The cooking element according to claim 11, wherein there are two orifices in said perforated bottom and two tongues carried by said perforated bottom, said two orifices are diametrically aligned with said two tongues, and said tongues are disposed peripherally of said orifices.

14. The cooking element according to claim 1, wherein said perforated bottom has on at least one-tenth of its periphery a zone that is free of an upper side wall.

15. The cooking element according to claim 14, wherein said perforated bottom is in the form of a grid that is free of an upper side wall.

16. The cooking element according to claim 1, wherein said perforated bottom and said tubular side wall are made of polycarbonate.

17. The cooking element according to claim 1, wherein said perforated bottom has a plurality of elliptical orifices and a plurality of round orifices.

18. The cooking element according to claim 1, wherein orifices for passage of steam extend over at least 15% of said perforated bottom.

19. The cooking element according to claim 7, wherein said perforated bottom has on at least one-tenth of its periphery a zone that is free of an upper side wall.

20. The cooking element according to claim 19, wherein said perforated bottom is in the form of a grid that is free of an upper side wall.

21. The cooking element according to claim 7, wherein said perforated bottom and said tubular side wall are made of polycarbonate.

22. The cooking element according to claim 7, wherein said perforated bottom has a plurality of elliptical orifices and a plurality of round orifices.

23. The cooking element according to claim 7, wherein orifices for passage of steam extend over at least 15% of said perforated bottom.

* * * * *